March 4, 1969     A. JACKNAU     3,431,052

AUTOMATIC FOCUSING DEVICE FOR PHOTOGRAPHIC REPRODUCER

Filed Oct. 21, 1966     Sheet 1 of 2

INVENTOR.
ALEX JACKNAU
BY
Connolly and Hutz
ATTORNEYS

United States Patent Office 3,431,052
Patented Mar. 4, 1969

3,431,052
AUTOMATIC FOCUSING DEVICE FOR PHOTOGRAPHIC REPRODUCER
Alex Jacknau, Berlin-Spandau, Germany, assignor to AGFA-Gevaert Aktiengesellschaft, Munich, Germany
Filed Oct. 21, 1966, Ser. No. 588,456
Claims priority, application Germany, Oct. 22, 1965, J 29,232
U.S. Cl. 355—58    10 Claims
Int. Cl. G03b 27/36

This invention relates to an automatic focusing device for the lens of a photographic reproducer, particularly a microfilm camera, in which the distance of the lens from the image plane is automatically adjusted in accordance with the distance of the reproducer from its object plane; and it more particularly relates to such a device in which the lens is movably mounted within a tubular housing and its adjustment is accomplished by means mounted beside the column upon which the reproducing head is movably mounted and is vertically adjustable.

In photographic reproduction devices such as cameras or enlargers, it is advantageous to automatically adjust the distance of the lens from image plane in accordance with the varying distance of a camera from its object plane or of an enlarger from its projection surface. The lens is therefore adjustably mounted and in the most simple type of device is manually adjusted. Various mechanical drives are utilized for this purpose, for example, rack and pinion gear assemblies in which the pinion is turned by a knob. The lens may also be adjusted by a spiral device which screws it up or down in a tube. It is also known to use an outer tube with a spiral cutout within which a pin connected to the inner tube is inserted. Adjustment of the pin within the cutout causes the inner tube to move back and forth with the lens rotating about its axis.

Such manual adjustment of the lens is not sufficiently accurate for more demanding photographic work and automatic focusing and lens setting is therefore a common resort. This is particularly vital when the image cannot be visually observed such as upon a ground glass plate, or if for example, it is impossible to utilize a range finder in conjunction with a lens focusing scale.

Automatic adjustment of the lens relative to the image plane has also been accomplished by mounting the lens so that it is axially movable and to accomplish such movement by a linkage operated from a slide cam connected to the front or adjacent to the column upon which the camera or enlarger is movably mounted. These slide cams (also referred to as swords) are in the form of shallow curves contacted by a lever of the connecting linkage. The linkage is translated in response to the adjusting movement of the camera or enlarger to adjust the lens distance from its image plane by means of various suitable mechanisms.

Such existing types of automatic lens adjusters or focusing devices are sufficient for most photographic purposes but they are not sufficiently accurate for high precision reproduction devices such as microfilm cameras. Microfilm reproducers, such as cameras or enlargers, operate on extremely reduced scale and therefore even the slightest inaccuracy in the lens setting materially affects their results. Microfilm devices therefore require a very precise lens adjustment which is extremely difficult and expensive to accomplish because focal distance, even in theoretically identical lenses, vary considerably in practice.

It is also very difficult as a practical matter to fit the slide cam and to assemble it with the operating linkage connecting it to the lens tube without play. Each individual device can be accurately adjusted to operate accurately if considerable time and expense is invested, but this expense becomes extremely high and prohibitive in the production of more complex devices.

An object of this invention is to provide an automatic focusing device for a photographic reproducer which avoids the aforementioned disadvantages of existing devices.

Another object is to provide an automatic focusing device which is economical to manufacture and install and extremely precise in operation.

In accordance with this invention problems in existing types of curved cam and slide systems are avoided and the entire focusing mechanism is installed within a tubular housing containing the lens tube. Automatic adjustment of the lens is accomplished by mounting a circular cam and follower means including a roller follower within the tubular housing. The axis of rotation of the roller is arranged approximately at an angle of 90° to the central axis of the tubular housing and it is rotated about this axis by a circular drive. This drive is operated by connection to a rack and pinion mounted substantially parallel to the column upon which the reproduction head moves upwardly and downwardly. The circular cam and follower means includes a circular cam connected to the lens tube. Operative engagement of the follower roller with the cam is maintained by a spring. Movement of the roller about the curved upper edge of the cam and their central axes causes the cam and the lens tube connected to it and accordingly the lens to move axially. The roller is advantageously mounted upon the outer wall of a sleeve upon which a worm gear wheel is mounted. A worm gear is mounted upon the outside of the tubular housing in cooperative engagement with the worm gear wheel. A shaft connects the worm gear to a pinion gear which meshes with a rack mounted substantially parallel to the column of the reproduction device. An intermediate tube is mounted within the outer tube and it includes a number of openings. The intermediate tube is disposed between the lens tube and the circular cam. The circular cam is connected to the lens tube by spacing connectors which extend through the openings in the intermediate tube. This constitutes the cam, lens tube and connecting spacers as a unitary assembly, which is axially moved within the limits prescribed by the extent of the apertures within the intermediate tube. The spring which maintains the cam and follower means in operative engagement is mounted about the intermediate tube and reacts between a flange at the lower end of the intermediate tube and the circular cam. The lower end of the tubular housing contacts the flange upon the intermediate tube and a threaded ring detachably connects the intermediate tube to the tubular housing at the flange. The worm gear wheel is supported within the tubular housing between a ring at the top of the housing and a ring mounted within the tubular housing above the roller. Free movement of the worm gear wheel is facilitated by ball bearings mounted between the circular worm gear wheel and two rings upon the tubular housing between which it lies.

Novel features and advantages of the present invention will become apparent to one skilled in the art from a reading of the following description in conjunction with the accompanying drawings wherein similar reference characters refer to similar parts and in which.

Figure 1:
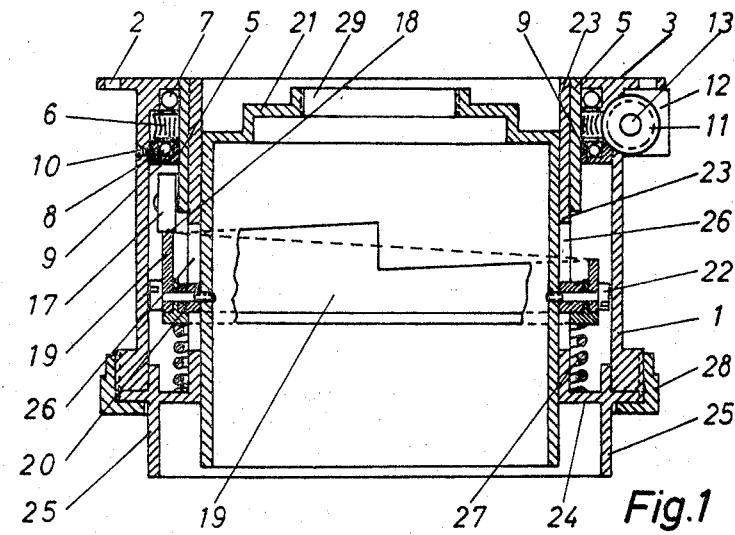
FIG. 1 is a cross-sectional view in elevation of one embodiment of this invention.
Figure 2:
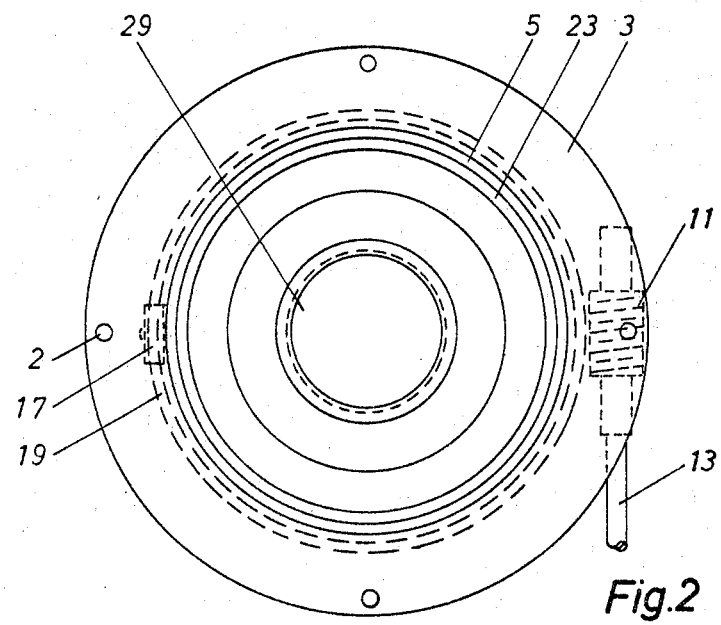
FIG. 2 is a top plan view of the embodiment shown in FIG. 1.
Figure 3:
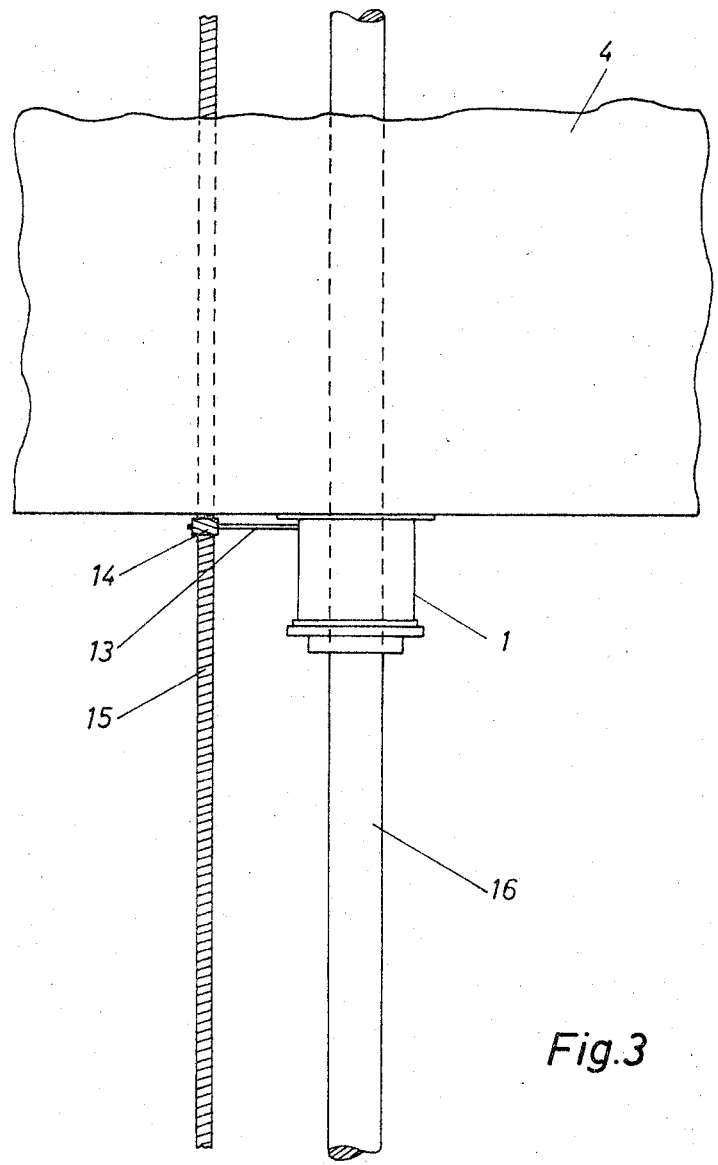
FIG. 3 is a simplified schematic diagram of the embodiment shown in FIGS. 1 and 2 connected to a photographic reproduction device.

In FIGS. 1 and 3 is shown outer tubular housing 1 connected by upper flange surface 3 with photographic reproduction device 4 by means of fasteners (not shown) inserted through holes 2. Tubular sleeve 5 is rotatably mounted within tubular housing 1. Circular worm gear wheel 6 is rigidly secured to sleeve 5 and it is rotatably mounted between circular ball bearing assemblies 7 and 8. Ball bearing assembly 7 is received within a recess at the top of tubular housing 1 and ball bearing assembly 8 is connected within tubular housing 1 by set screws 10. Worm gear 11 engages worm gear wheel 6 through an aperture in the wall of houscing 1, and it is rotatably mounted in supporting bracket 12 connected to the outside of tubular housing 1. Shaft 13 connects the axis of worm gear 11 to pinion 14 shown in FIG. 3. As shown in FIG. 3, pinion 14 meshes with rack 15 mounted parallel to column 16 upon which reproduction device 4 is movably mounted Pinion 14 and rack 15 are, for example, of helical form.

Roller 17 is rotatably mounted upon the outer side of tubular sleeve 5. Roller 17 is part of a circular cam and follower means including circular cam 19 which it engages at point 18 as shown in FIG. 1. Circular cam 19 is connected to inner lens tube 21 by spacing connectors including cap screws 22 and bushings 20 to form a unitary assembly therewith. An intermediate tube 23 is disposed between the inside of tubular sleeve 5 and the outside of lens tube 21. Intermediate tube 23 includes a flange 24 near its lower end and an outer lower collar 25 extending from flange 24. Cap screws 22 and spacers 20 extend through openings 26 in intermediate tube 23. Coil spring 27 is supported at its lower end on flange 24 of intermediate tube 23 with its upper end reacting against the lower edge of circular cam 19. Coil spring 27 accordingly maintains circular cam 19 in operative engagement with follower roller 17. Threaded ring 28 maintains flange 24 of intermediate tube 23 connected to the lower end of tubular housing 1. The lens (not shown) is screwed within threaded opening 29 at the top of lens tube 21.

OPERATION

As reproduction device 4 moves upwardly and downwardly on column 16, pinion 14 in mesh with rack 15 is mounted to rotate shaft 13, which in turn rotates worm 11 mounted on bracket 12 outside of the upper end of tubular housing 1. Rotation of worm 11 is transmitted to worm gear wheel 6 through tubular housing 1 and then to tubular sleeve 5. Roller 17 rotatably connected to tubular sleeve 5 turns around with sleeve 5 about the central axis of tubular housing 1. The periphery of roller 17, as shown in FIG. 1, contacts the upper edge of circular cam 19 which is pressed against it by spring 27. Cam 19 is connected by cap screws 22 and bushings 20 with lens tube 21, and these connected parts accordingly form a unitary assembly.

Circular movement of roller 17 together with sleeve 5 about the longitudinal axis of tubular housing 1 causes roller 17 to ride about the upper edge of cam 19. The curved shape of cam 19 causes cam 19 to be moved against the reaction of spring 27 in accordance with the position of roller 17 relative to its curved upper edge. This causes cam 19 to rise or fall in accordance with the height of the portion of its curved upper edge contacting roller 17. Since cam 19 is rigidly connected with lens tube 21, movement of cam 19 up and down causes the lens inserted within threaded opening 29 in lens tube 21 to move correspondingly.

Bushings 20, extending through openings 26 in the intermediate tube 23, also operate in conjunction with openings 26 to limit the rotation and the upward and downward movement of connected cam 19 and lens tube 21.

Retention and support of worm gear wheel 6 between circular ball bearing assemblies 7 and 8 provide a relatively friction-free and free-turning mounting for worm gear wheel 6 and roller 17 connected to it through sleeve 5. The entire assembly is held together within tubular housing 1 by threaded ring or nut 28.

The automatic focusing device of this invention has the following advantages:

There is first the advantage of eliminating the existing elongated curved sliding cam mounted in front of or next to the column upon which the head of the reproduction device moves up and down. This provides the advantage of eliminating extensive and difficult correction of the curved cam slides, which in view of their great length is extremely difficult to accomplish and practically impossible with precision. In contrast thereto the relatively compact circular cam and follower device of this invention is completely accommodated within the interior of the tubular housing. It can also be easily processed, adjusted and compensated in accordance with characteristics of individual lenses with the concomitant advantages of facility and economy of manufacture and extremely great precision of operation. All of the parts of the focusing device of this invention can be accurately assembled without requiring appreciable skill because they are precision finished, as aforementioned, and therefore are easily assembled and secured by simple fasteners, such as screws.

A further advantage of this focusing device is that its finished assembly can easily be operatively connected to photographic reproduction devices without complication. The rack and pinion drive is very easily interchangeable without requiring a preliminary adjustment for each unit, which preexisting curved cam slide devices always require.

Finally, a further advantage is the ease of interchanging the circular cam for one having a different contour when this becomes necessary, such as when a lens having a different focal length is utilized. Accommodation of lenses with different focal lengths is thereby facilitated without changing any other parts of the focusing device.

This invention is not limited to the specific embodiment shown in the drawings. If frictional interference is not important, the ball bearing supporting the worm gear wheel can be eliminated. The roller can also be replaced by a sliding pin or other follower type device. The one large cross section spring shown in the drawing can also be replaced by several small coil springs placed about the periphery of the circular cam and reacting against its lower edge.

What is claimed is:

1. An automatic focusing device for a photographic reproducer mounted upon a column upon which it is vertically adjustable relative to its object surface, said reproducer having a lens and image plane the distance between which is adjustable in accordance with the distance of said reproducer from said object surface, said device comprising a tubular housing connected to said reproducer, said lens being attached to a lens tube which is mounted to slide axially within said tubular housing whereby its distance from said image plane is varied, circular cam and follower means mounted within said tubular housing and providing axial movement therewithin in response to its rotation, connecting means coupling said lens tube to said circular cam and follower means whereby axial movement of said lens tube is obtained in response to said rotation of said circular cam and follower means, circular drive means mounted upon said tubular housing and connected to said circular cam and follower means whereby said circular cam and follower means is rotated, rack and pinion gear means mounted substantially parallel to said column for providing a rotational output related to the position of said reproducer upon said column, and transmission means connecting said rack and pinion means to said circular drive means whereby the axial position of said lens is automatically adjusted relative to said image plane in response to movement of said reproducer upon said column relative to said object surface.

2. An automatic focusing device as set forth in claim 1 wherein said cam and follower means includes spring means maintaining it in operative engagement.

3. An automatic focusing device as set forth in claim 2 wherein said lens tube is connected to the cam portion of said circular cam and follower means.

4. An automatic focusing device as set forth in claim 3 wherein said follower means comprises roller means, and circular bearing means mounting said roller means within said tubular housing for rotation therewithin in operative contact with said circular cam means.

5. An automatic focusing device as set forth in claim 4 wherein said circular drive means comprises a worm drive mounted upon said tubular housing in operative engagement with said sleeve means whereby said roller is rotated in response to movement of said worm drive.

6. An automatic focusing device as set forth in claim 5 wherein said worm drive includes a worm wheel secured to the periphery of said sleeve and a worm gear in operative engagement therewith, and said transmission means includes a shaft extending from said pinion of said rack and pinion means to said worm gear.

7. An automatic focusing device as set forth in claim 6 wherein an intermediate tube is disposed within said tubular housing and connected therewith, said intermediate tube being disposed between said lens tube and said circular cam and follower means, said intermediate tube including apertures, and spacing connectors extending through said apertures connecting said cam and follower means with said lens tube for transmitting motion of said cam and follower means to said lens.

8. An automatic focusing device as set forth in claim 7 wherein a spring is mounted about said intermediate tube, a flange upon a lower portion of said intermediate tube, and said spring reacting between said flange and said circular cam means whereby said circular cam means is maintained in firm engagement with said follower means.

9. An automatic focusing device as set forth in claim 8 wherein the lower end of said tubular housing is disposed in contact with said flange, and threaded ring means detachably connects said flange to said lower end of said tubular housing.

10. An automatic focusing device as set forth in claim 9 wherein said worm gear wheel is secured to said sleeve, and circular ball bearing means movably mounts said worm gear wheel within said tubular housing.

References Cited
UNITED STATES PATENTS

| | | | |
|---|---|---|---|
| 2,940,358 | 6/1960 | Rosenthal | 88—24 |
| 3,179,028 | 4/1965 | Wohner | 95—44 |

JOHN M. HORAN, *Primary Examiner.*

RICHARD L. MOSES, *Assistant Examiner.*

U.S. Cl. X.R.

95—44